US012562490B2

(12) United States Patent
Kelley

(10) Patent No.: US 12,562,490 B2
(45) Date of Patent: Feb. 24, 2026

(54) MINIATURIZED LONG-TERM EVOLUTION ANTENNA

(71) Applicant: TAOGLAS GROUP HOLDINGS LIMITED, Enniscorthy (IE)

(72) Inventor: Timothy Patrick Kelley, San Diego, CA (US)

(73) Assignee: Taoglas Group Holdings Limited, Enniscorthy (IE)

( * ) Notice: Subject to any disclaimer, the term of this patent is extended or adjusted under 35 U.S.C. 154(b) by 165 days.

(21) Appl. No.: 18/412,815

(22) Filed: Jan. 15, 2024

(65) Prior Publication Data

US 2024/0250439 A1 Jul. 25, 2024

Related U.S. Application Data

(60) Provisional application No. 63/440,058, filed on Jan. 19, 2023.

(51) Int. Cl.
*H01Q 9/42* (2006.01)
*H01Q 1/24* (2006.01)
*H01Q 1/38* (2006.01)

(52) U.S. Cl.
CPC ................. *H01Q 9/42* (2013.01); *H01Q 1/38* (2013.01); *H01Q 1/243* (2013.01)

(58) Field of Classification Search
None
See application file for complete search history.

(56) References Cited

U.S. PATENT DOCUMENTS 6,897,812 B2 5/2005 Huang
2004/0145528 A1* 7/2004 Mukai .................... H01Q 1/243 343/702
2004/0160368 A1* 8/2004 Huang .................. H01Q 5/371 343/895
2006/0256031 A1 11/2006 Bae et al.
2018/0183143 A1 6/2018 Hall et al.
2022/0123481 A1* 4/2022 Kim ......................... H01Q 1/38

* cited by examiner

*Primary Examiner* — Anh Q Tran
(74) *Attorney, Agent, or Firm* — Garson & Gutierrez, PC

(57) ABSTRACT

A miniaturized long-term evolution (LTE) antenna. In one embodiment, the antenna includes a dielectric substrate comprising a first surface and a second opposing surface; a first metallization layer disposed on the first surface of the dielectric substrate, the first metallization layer comprising a first metallization, a second metallization, a third metallization, and a fourth metallization; and a second metallization layer disposed on the second opposing surface of the dielectric substrate, the second metallization layer comprising a fifth metallization, a sixth metallization, a seventh metallization, an eighth metallization, and a ninth metallization. The antenna includes a plurality of through hole vias that: connect the first metallization with the fifth metallization; connect the second metallization with both the sixth metallization and the seventh metallization; and connect the fourth metallization with both the fifth metallization and the sixth metallization. System level implementations are also disclosed.

15 Claims, 13 Drawing Sheets

MINIATURIZED LONG-TERM EVOLUTION ANTENNA

PRIORITY

This application claims the benefit of priority to U.S. Provisional Patent Application Ser. No. 63/440,058 filed Jan. 19, 2023, of the same title, the contents of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

The present disclosure relates generally to small form factor antennas, and more particularly in one exemplary aspect to efficient long-term evolution (LTE) antennas that operate across a wide variety of operating bands (e.g., at 700 MHz-800 MHZ as well as 1700-2155 MHz) in a miniaturized (e.g., <30 mm in the largest dimension) form factor.

2. Field of the Disclosure

Traditionally, low profile surface mountable LTE antenna devices that operate with high efficiency in LTE frequency bands have been limited in terms of the smallest size form factor available. For example, the Assignee of the present disclosure has previously developed a surface mountable LTE antenna that provides high efficiency in a form factor of 42 mm by 10 mm by 3 mm that operates both in lower LTE frequency bands (e.g., 700 MHz-800 MHz) as well as in higher LTE frequency bands (e.g., 1700-2155 MHz). Attempts to minimize the overall form factor beyond this size have proven difficult. For example, providing both a low and high resonant frequency antenna suitable for use in LTE applications has resulted in inherent capacitance buildups within the antenna structure that degrades the bandwidth capabilities of the antenna, making their development and design untenable. Moreover, prior efforts in implementing smaller form factor LTE antennas have resulted in unwanted parasitic capacitances resulting in undesirable resonant structures in the antenna design that result in efficiency dropouts within the intended operating bandwidth of the antenna. Accordingly, new techniques are needed that address the deficiencies associated with, for example, decreased form factor LTE antennas.

SUMMARY

The present disclosure satisfies the foregoing needs by providing, inter alia, methods, apparatus and systems for the implementation of small form factor LTE antennas that address the deficiencies recognized above.

In one aspect, an antenna is disclosed. In one embodiment, the antenna is for use in long-term evolution (LTE) frequency bands and includes a dielectric substrate comprising a first surface and a second opposing surface; a first metallization layer disposed on the first surface of the dielectric substrate, the first metallization layer comprising a first discrete metallization, a second discrete metallization, a third discrete metallization, and a fourth discrete metallization; and a second metallization layer disposed on the second opposing surface of the dielectric substrate, the second metallization layer comprising a fifth discrete metallization, a sixth discrete metallization, a seventh discrete metallization, an eighth discrete metallization, and a ninth discrete metallization. The antenna includes a plurality of through hole vias that: connect the first discrete metallization with the fifth discrete metallization; connect the second discrete metallization with both the sixth discrete metallization and the seventh discrete metallization; and connect the fourth discrete metallization with both the fifth discrete metallization and the sixth discrete metallization.

In one variant, the seventh discrete metallization, the eighth discrete metallization, and the ninth discrete metallization are external terminations for a system level printed circuit board.

In another variant, the first discrete metallization has a generally rectangular shape.

In yet another variant, the second discrete metallization has a generally L-shaped metallization, the generally L-shaped metallization having two of the plurality of through hole vias, the two of the plurality of through hole vias being positioned at opposing ends of the generally L-shaped metallization.

In yet another variant, the second discrete metallization includes both a choke point and a truncation feature.

In yet another variant, the truncation feature is positioned generally between the fifth discrete metallization and the sixth discrete metallization.

In yet another variant, the fourth discrete metallization includes a generally U-shaped metallization, the generally U-shaped metallization including an additional two of the plurality of through hole vias, the additional two of the plurality through hole vias being positioned at opposing ends of the generally U-shaped metallization.

In yet another variant, the fourth discrete metallization further includes an angled contour as well as a staircasing feature.

In yet another variant, less than an entire portion of the angled contour overlaps the sixth discrete metallization.

In yet another variant, the staircasing feature is positioned generally between the eighth discrete metallization and the ninth discrete metallization.

In another aspect, system level implementations for the antenna referenced above are also disclosed. In one embodiment, the system includes an antenna for use in long-term evolution (LTE) frequency bands, the antenna including a dielectric substrate having a first surface and a second opposing surface; a first metallization layer disposed on the first surface of the dielectric substrate, the first metallization layer including a first discrete metallization, a second discrete metallization, a third discrete metallization, and a fourth discrete metallization; and a second metallization layer disposed on the second opposing surface of the dielectric substrate, the second metallization layer including a fifth discrete metallization, a sixth discrete metallization, a seventh discrete metallization, an eighth discrete metallization, and a ninth discrete metallization. The antenna includes a plurality of through hole vias that: connect the first discrete metallization with the fifth discrete metallization; connect the second discrete metallization with both the sixth discrete metallization and the seventh discrete metallization; and connect the fourth discrete metallization with both the fifth discrete metallization and the sixth discrete metallization; and a system level printed circuit board upon which the antenna is disposed.

In one variant, the seventh discrete metallization, the eighth discrete metallization, and the ninth discrete metallization include external terminations for the system level printed circuit board.

In another variant, the seventh discrete metallization includes a signal interface to a feed connection located on the system level printed circuit board; and the eighth discrete metallization includes an interface to matching circuitry located on the system level printed circuit board.

In yet another variant, the matching circuitry includes a switch that enables the antenna to switch between a plurality of operating frequencies for the antenna.

In yet another variant, the first discrete metallization includes a generally rectangular shape.

In yet another variant, the second discrete metallization includes a generally L-shaped metallization, the generally L-shaped metallization having two of the plurality of through hole vias, the two of the plurality of through hole vias being positioned at opposing ends of the generally L-shaped metallization.

In yet another variant, the fourth discrete metallization includes a generally U-shaped metallization, the generally U-shaped metallization having an additional two of the plurality of through hole vias, the additional two of the plurality through hole vias being positioned at opposing ends of the generally U-shaped metallization.

In yet another variant, the fourth discrete metallization further includes an angled contour as well as a staircasing feature.

In yet another variant, less than an entire portion of the angled contour overlaps the sixth discrete metallization.

In yet another variant, the staircasing feature is positioned generally between the eighth discrete metallization and the ninth discrete metallization.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the present disclosure will become more apparent from the detailed description set forth below when taken in conjunction with the drawings, wherein.

All Figures disclosed herein are © Copyright 2022-2024 Taoglas Group Holdings Limited. All rights reserved.

DETAILED DESCRIPTION

Exemplary Embodiments

Detailed descriptions of the various embodiments and variants of the apparatus and methods of the present disclosure are now provided. It is noted that wherever practicable similar or like reference numbers may be used in the figures and may indicate similar or like functionality. The figures depict embodiments of miniaturized LTE antennas as well as exemplary systems that integrate these LTE antennas for purposes of illustration only. One skilled in the art will readily recognize from the following description that alternative embodiments of the structures and methods illustrated may be employed without necessarily departing from the principles described herein.

For example, while the various features discussed herein are primarily described in terms of a given frame of reference (e.g., top, bottom, left and right from a preestablished orientation), it would be readily apparent to one of ordinary skill given the contents of the present disclosure that this chosen frame of reference is arbitrary and other suitable descriptions in alternative frames of reference may be chosen to describe the various features of the miniaturized LTE antenna structures described herein. Moreover, while primarily discussed in terms of a specific LTE operating scenario, it would be readily apparent to one of ordinary skill given the contents of the present disclosure that the techniques described herein may be bodily incorporated in other antenna operating scenarios outside of LTE frequency bands.

Exemplary Miniaturized LTE Antenna—

Figure 1A:
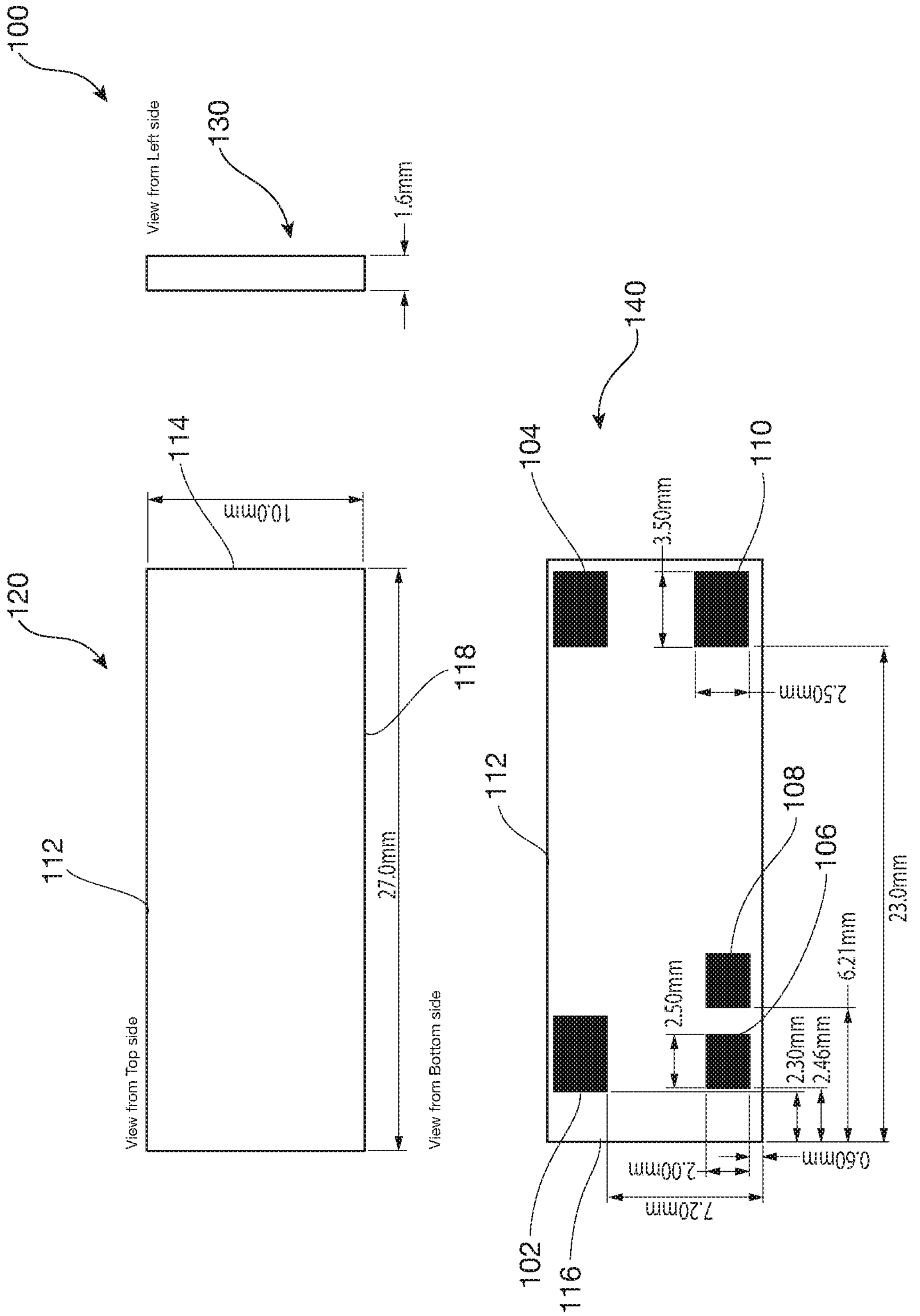
FIG. 1A is top plan view, side plan view, and pad layout of a first exemplary miniaturized LTE antenna, in accordance with the principles of the present disclosure.
Figure 1B:
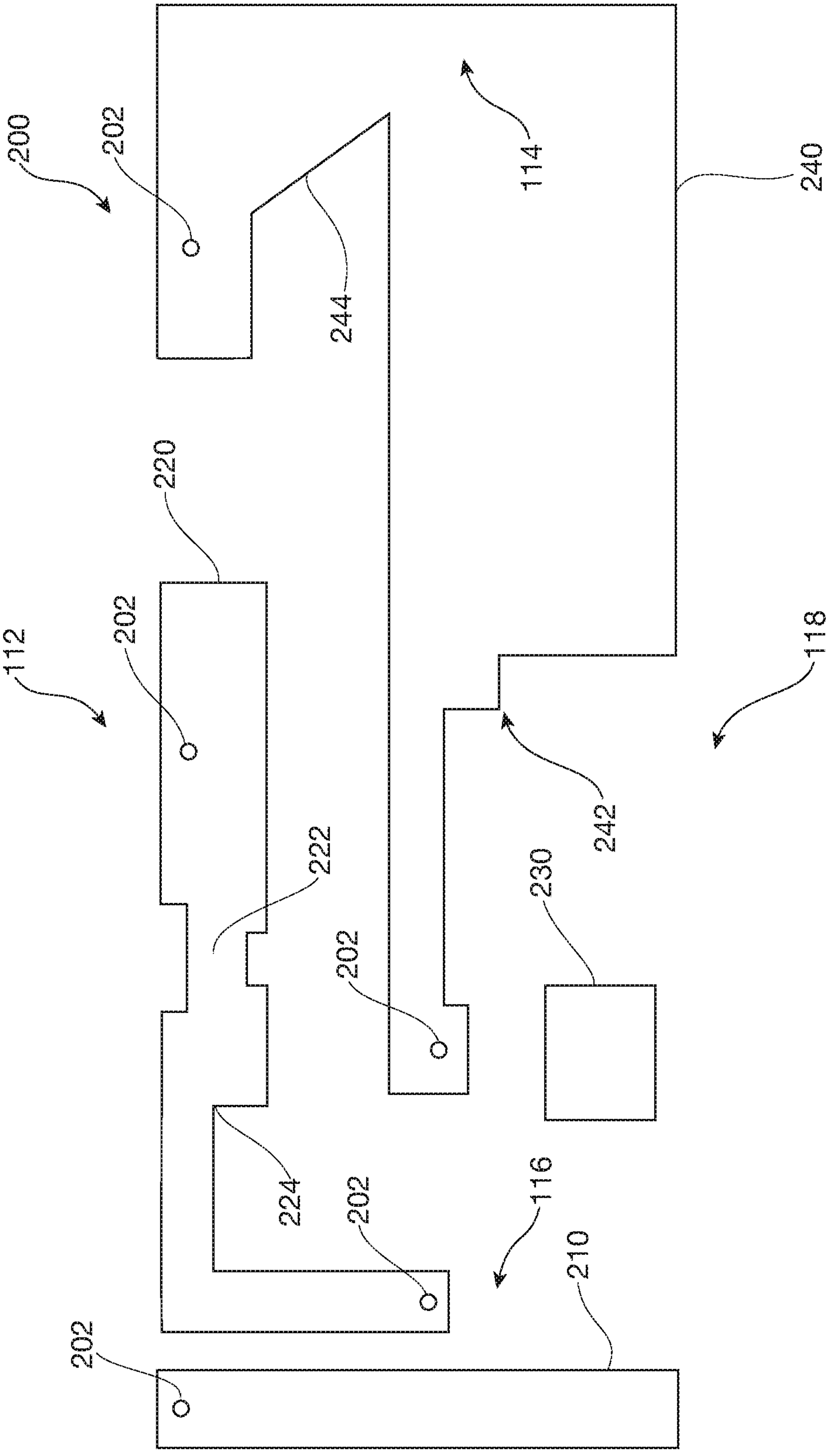
FIG. 1B is a top plan view of the top layer metallization for the miniaturized LTE antenna of FIG. 1A, in accordance with the principles of the present disclosure.
Figure 1C:
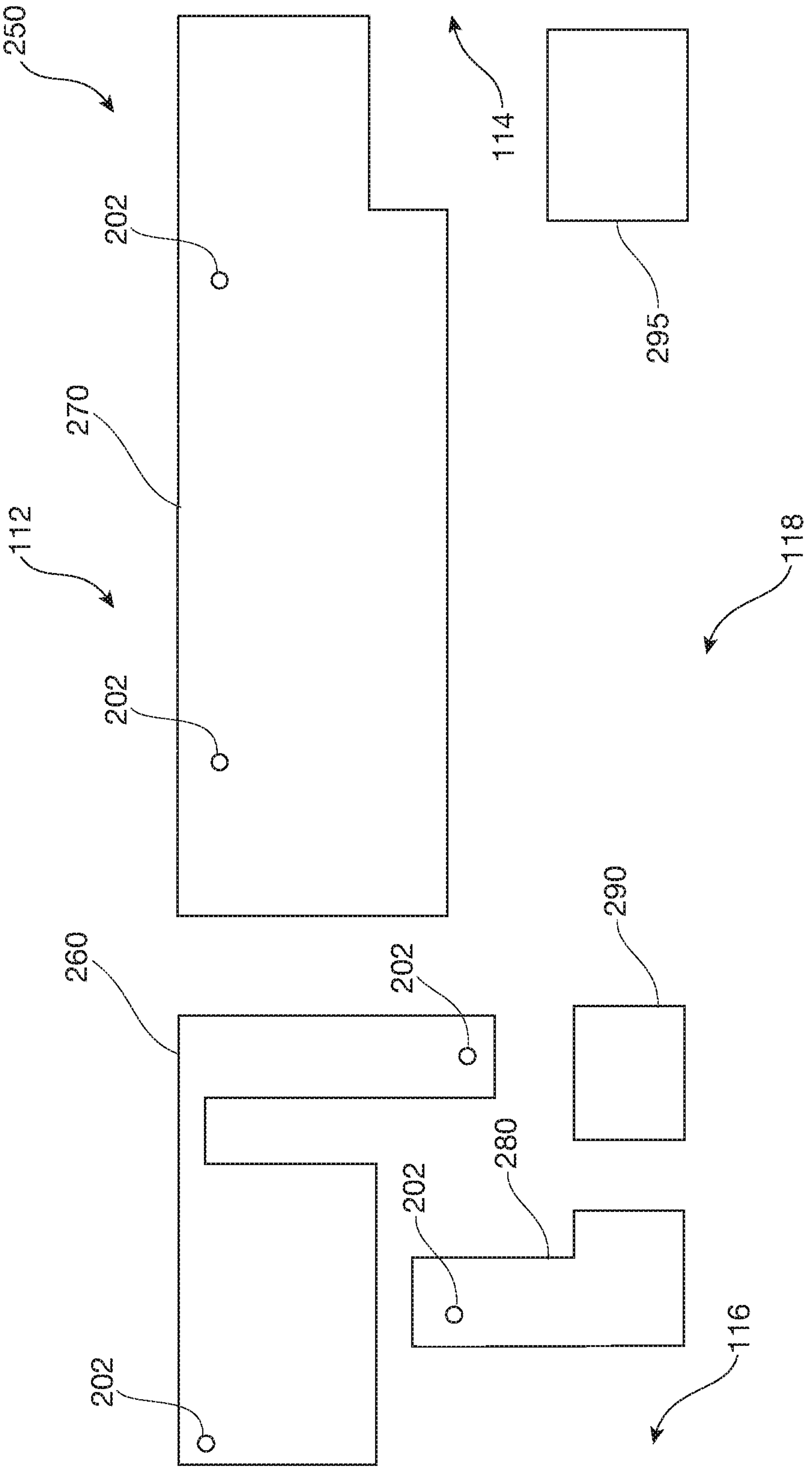
FIG. 1C is a top plan view of the bottom layer metallization for the miniaturized LTE antenna of FIG. 1A, in accordance with the principles of the present disclosure.

Referring now to FIGS. 1A-1C, an exemplary antenna 100 for use in, for example, LTE applications is shown and described in detail. In FIG. 1A, the antenna 100 is shown having a form factor of 27 mm by 10 mm by 1.6 mm. Accordingly, the antenna 100 illustrated in FIGS. 1A-1C provides for a 292% reduction in antenna volume (or approximately a third of the antenna volume) as compared with prior surface mountable LTE antennas described supra. The antenna 100 illustrated in FIGS. 1A-1C may consist of a monopole antenna, though the antenna 100 may be adapted for other configurations such as a planar inverted-F antenna (PIFA) when external electronic component(s) are utilized in conjunction with the antenna 100. Looking now at the top view 120 of the antenna 100, the longer side dimension is 27.0 mm with the shorter side dimension being 10.0 mm. Moreover, the top view 120 of the antenna 100 indicates the top side 112 of the antenna 100, the right side 114 of the antenna 100, the bottom side 118 of the antenna 100, and the left side 116 of the antenna 100. As previously alluded to above, the notations to top side 112, right side 114, bottom side 118, and left side 116 here are arbitrary and are intended herein to describe, inter alia, various features of the footprint layout 140 for the antenna 100 as well as the artwork. The side view 130 of the antenna is shown as being 1.6 mm in height, providing for the aforementioned overall form factor of 27 mm by 10 mm by 1.6 mm. While specific dimensions have been shown with respect to the embodiment depicted in FIG. 1A, it would be readily apparent to one of ordinary skill given the contents of the present disclosure that these dimensions may be modified in alternative implementations.

Referring now to the footprint layout 140 for the antenna 100 shown in FIG. 1A, the antenna 100 is intended to be implemented with five (5) surface mount pad connections 102, 104, 106, 108, and 110 in a system level implementation 300. The top left pad 102 and the top right pad 104 are positioned to be the maximum distance away from the ground plane on the system level implementation 300. Accordingly, these two pads 102, 104 facilitate radiation for the antenna 100. In other words, the top left pad 102 and the top right pad 104 are connected to the antenna 100 itself, thereby allowing the system level implementation printed circuit board ("PCB") 300 to offload some of the radiation capabilities (i.e., to transmit and/or receive signals) for the antenna 100. Such an implementation allows the overall form factor for the antenna 100 to be smaller in size than it otherwise would need to be for its given operating characteristics. This smaller form factor allows the antenna 100 to be lower in cost from both a material standpoint (i.e., as less material may be needed for the substrate and metallization) as well as a packaging point of view (i.e., more antennas 100 may be packaged per unit packaging size as compared with a larger size antenna). The bottom left pad 106 acts as the signal interface for the antenna 100, allowing the antenna 100 to transmit and/or receive signals. The bottom middle pad 108 may be connected with a matching circuit as described in further detail infra, while the bottom right pad 110 may be utilized as additional mechanical support for the antenna 100. Again, while specific dimensions and locations have been shown with respect to the footprint layout 140 pads for the antenna 100 depicted in FIG. 1A, it would be readily apparent to one of ordinary skill given the contents of the present disclosure that these dimensions may be modified in size, location, and/or the number of pads 102, 104, 106, 108, and 110 (e.g., more, or less) in alternative implementations.

Referring now to FIG. 1B, the top layer artwork 200 of the antenna is shown and described in detail. As used herein, the term top layer artwork 200 refers to the layer of artwork that is disposed further away from the system level PCB 300, to which the antenna 100 is mounted, than the bottom layer artwork 250 illustrated in FIG. 1C. As illustrated in FIG. 1B, the top layer artwork 200 includes four (4) discrete metallization(s), namely, the first metallization 210, the second metallization 220, the third metallization 230, and the fourth metallization 240. The first metallization 210 may be positioned on the left side 116 of the antenna 100 and may be generally rectangular in shape. At the top portion of the first metallization 210, is a through hole via 202, which connects the top layer artwork 200 with the bottom layer artwork 250 illustrated in FIG. 1C. The first metallization 210 contributes to the lower band frequency performance of the antenna 100, although there may be substantial radiation coming off the corners of the antenna 100 as well (e.g., from the top left pad 102 and the top right pad 104 shown in FIG. 1A).

Surface current simulations for the second metallization 220 were utilized to maximize the derivative of current with respect to space. Specifically, the second metallization 220 may be generally L-shaped, although the second metallization 220 may utilize one or more choke point(s) 222 and one or more truncation feature(s) 224 to maximize the derivative of current with respect to space. In some implementations, the choke point(s) 222 may be positioned between the fifth metallization (260, FIG. 1C) and the sixth metallization (270, FIG. 1C) when the top layer artwork 200 is positioned over the bottom layer artwork 250. The lower left-hand corner of the second metallization 220 as well as the upper right-hand corner of the second metallization 220 may also include through hole vias 202 that have been strategically placed to maximize antenna radiating efficiency. As a brief aside, placement of the through hole vias 202 aid in maximizing radiation efficiency by positioning these vias 202 so that these vias 202 are either coincident with air or otherwise close to the PCB edge.

As a brief aside, the minimization of the overlap of the metallization's 210, 220, 230, 240 present on the top layer 200 of the antenna 100 with the metallization's 260, 270, 280, 290, 295 present on the bottom layer 250 of the antenna 100 results in minimization of inherent capacitance. This minimization of capacitance in turn maximizes the bandwidth operating characteristics for the antenna 100. The second metallization 220 on the top layer artwork 200 overlaps portions of the metallization areas on the bottom layer artwork 250 shown in FIG. 1C (i.e., portions of the fifth metallization 260, the sixth metallization 270, and the seventh metallization 280). The third metallization 230 may be generally rectangular in shape and may be generally overlaid with the eighth metallization 290 (or portions thereof) shown in FIG. 1C. The fourth metallization 240 may be generally U-shaped. The fourth metallization 240 may also include two through hole vias 202 positioned on opposing ends of the generally U-shaped fourth metallization 240. The through hole via 202 located in the upper right of the fourth metallization 240 may be connected with the sixth metallization 270 on the bottom layer artwork 250 of the antenna 100, while the through hole via 202 located on the left-hand side of the fourth metallization is connected with the fifth metallization 260 on the bottom layer artwork 250 of the antenna 100. The upper right portion of the fourth metallization 240 may also include one or more angled contour(s) 244, while the lower portion of the fourth metallization 240 may include one or more staircasing feature(s) 242. In some implementations, the angled contour 244 (or portions thereof) may overlap portions of the sixth metallization 270 shown in FIG. 1C, while the staircasing feature

242 may be positioned between the eighth metallization 290 and the ninth metallization 295 shown in FIG. 1C. Again, one or more of these features 242, 244 maximize the derivative of current with respect to space for the antenna 100.

Referring now to FIG. 1C, the bottom layer artwork 250 is shown and described in detail. As used herein, the bottom layer artwork 250 refers to the artwork layer located closer to the system level PCB 300, upon which the antenna 100 is mounted, as compared with the top layer artwork 200. The fifth metallization 260 may be generally U-shaped with the left-hand rectangular portion of the fifth metallization 260 being connected with the right-hand rectangular portion of the fifth metallization 260. The upper left and bottom right of the fifth metallization 260 may also include the aforementioned through hole vias 202 that connect the fifth metallization 260 with portions of the top layer artwork 200. The sixth metallization 270 may be generally rectangular in shape with a truncated lower right-hand corner. Through hole vias 202 located on the sixth metallization may be connected with portions of the top layer artwork 200. These through hole vias 202 may be generally located on the upper portion of the sixth metallization 270. A seventh metallization 280 may be L-shaped and may have a through hole via 202 that connects the seventh metallization 280 with the second metallization 220 located on the top layer artwork 200 of the antenna 100. The eighth metallization 290 and the ninth metallization 295 are generally rectangular in shape with the eighth metallization 290 being positioned generally underneath the third metallization 230, while the ninth metallization 295 is positioned underneath the lower right-hand corner of the fourth metallization 240. The eighth metallization 290 is also utilized to connect the antenna 100 to ground in system level implementations.

Figure 2A:
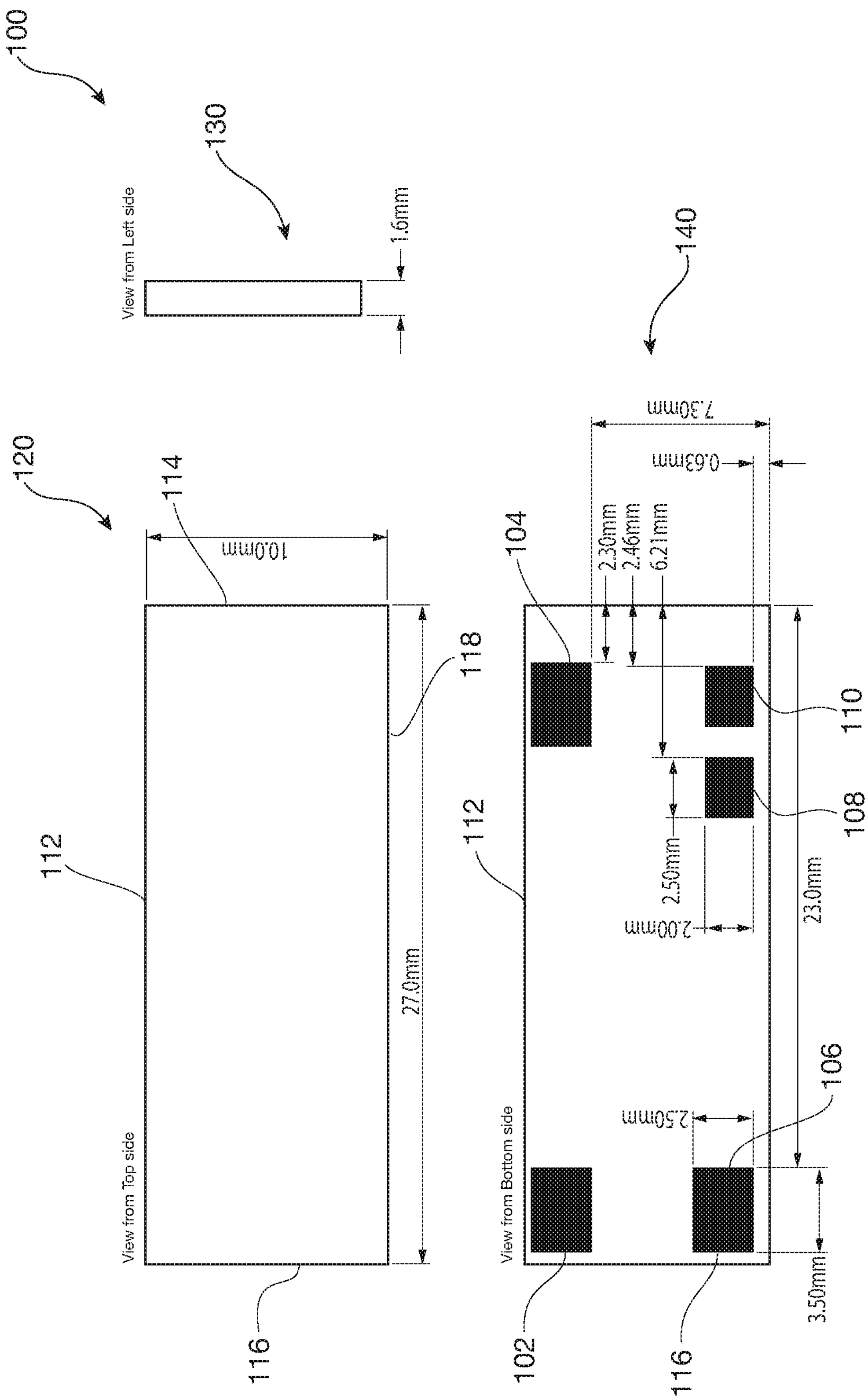
FIG. 2A is top plan view, side plan view, and pad layout of a second exemplary miniaturized LTE antenna, in accordance with the principles of the present disclosure.
Figure 2B:
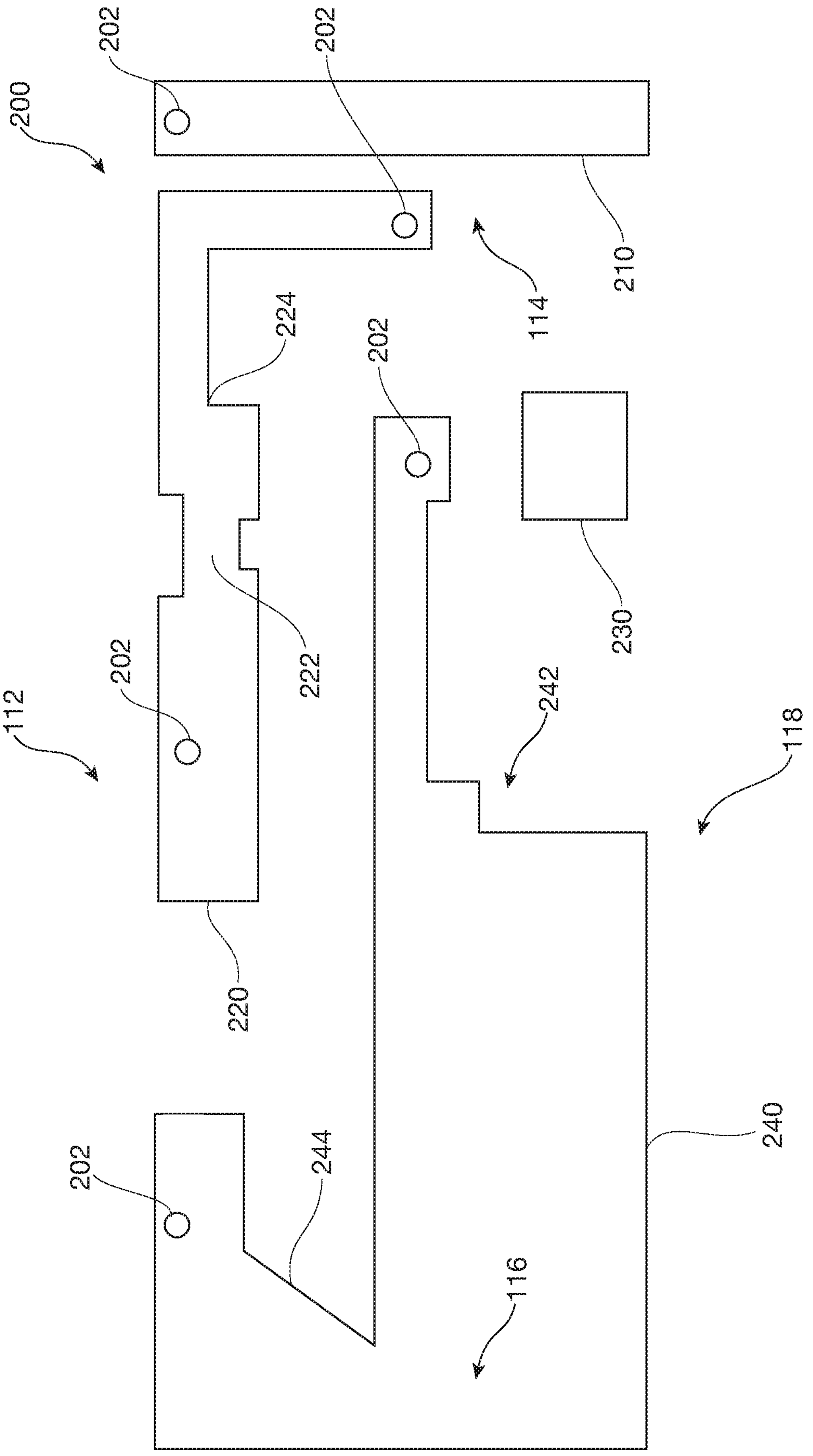
FIG. 2B is a top plan view of the top layer metallization for the miniaturized LTE antenna of FIG. 2A, in accordance with the principles of the present disclosure.
Figure 2C:
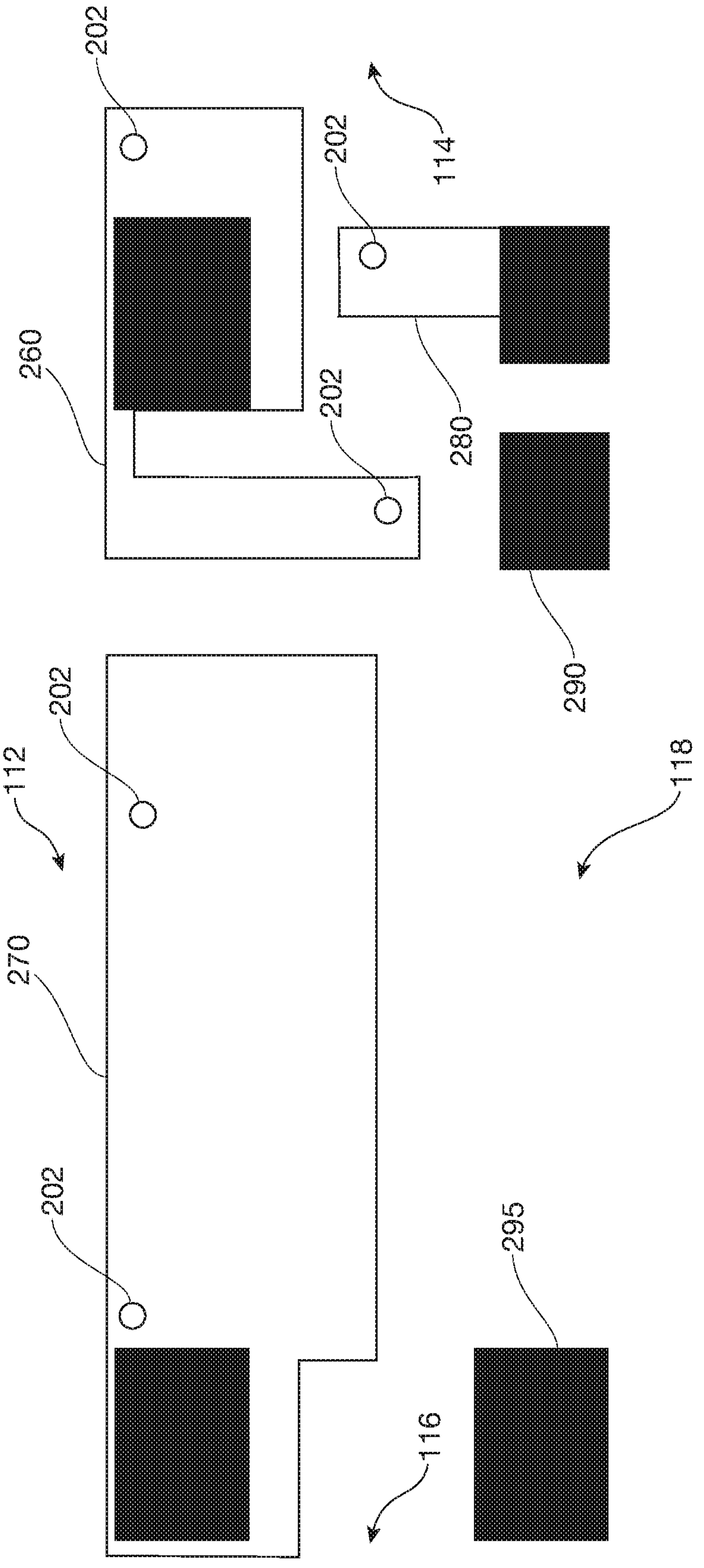
FIG. 2C is a top plan view of the bottom layer metallization for the miniaturized LTE antenna of FIG. 2A, in accordance with the principles of the present disclosure.

Referring now to FIGS. 2A-2C, another exemplary antenna 100 for use in, for example, LTE applications is shown and described in detail. Specifically, the artwork of the exemplary antenna 100 shown in FIGS. 2A-2C is essentially a mirror image of the artwork for the antenna 100 illustrated in FIGS. 1A-1C. In FIG. 2A, and similar to the antenna 100 shown in FIG. 1A, the antenna 100 is shown having a form factor of 27 mm by 10 mm by 1.6 mm. Accordingly, the antenna 100 illustrated in FIGS. 2A-2C also provides for a 292% reduction in antenna volume (or approximately a third of the antenna volume) as compared with prior surface mountable LTE antennas described supra. The antenna 100 illustrated in FIGS. 2A-2C may also consist of a monopole antenna, though the antenna 100 may be adapted for other configurations such as a planar inverted-F antenna (PIFA) when external electronic component(s) are utilized in conjunction with the antenna 100. Looking now at the top view 120 of the antenna 100, the longer side dimension is 27.0 mm with the shorter side dimension being 10.0 mm. Moreover, the top view 120 of the antenna 100 indicates the top side 112 of the antenna 100, the right side 114 of the antenna 100, the bottom side 118 of the antenna 100, and the left side 116 of the antenna 100. As previously alluded to above, the notations to top side 112, right side 114, bottom side 118, and left side 116 here are arbitrary and are intended herein to describe, inter alia, various features of the footprint layout 140 for the antenna 100 as well as the artwork. The side view 130 of the antenna is shown as being 1.6 mm in height, providing for the aforementioned overall form factor of 27 mm by 10 mm by 1.6 mm. While specific dimensions have been shown with respect to the embodiment depicted in FIG. 2A, it would be readily apparent to one of ordinary skill given the contents of the present disclosure that these dimensions may be modified in alternative implementations.

Referring now to the footprint layout 140 for the antenna 100 shown in FIG. 2A, the antenna 100 is intended to be implemented with five (5) surface mount pad connections 102, 104, 106, 108, and 110 in a system level implementation 400. The top left pad 102 and the top right pad 104 are positioned to be the maximum distance away from the ground plane on the system level implementation 400. Accordingly, these two pads 102, 104 facilitate radiation for the antenna 100. In other words, the top left pad 102 and the top right pad 104 are connected to the antenna 100 itself, thereby allowing the system level implementation printed circuit board ("PCB") 400 to offload some of the radiation capabilities (i.e., to transmit and/or receive signals) for the antenna 100. Such an implementation allows the overall form factor for the antenna 100 to be smaller in size than it otherwise would need to be for its given operating characteristics. This smaller form factor allows the antenna 100 to be lower in cost from both a material standpoint (i.e., as less material may be needed for the substrate and metallization) as well as a packaging point of view (i.e., more antennas 100 may be packaged per unit packaging size as compared with a larger size antenna). The bottom right pad 110 acts as the signal interface for the antenna 100, allowing the antenna 100 to transmit and/or receive signals. The bottom middle pad 108 may be connected with a matching circuit as described in further detail infra, albeit mirrored from the position illustrated in FIG. 1A, while the bottom left pad 110 may be utilized as additional mechanical support for the antenna 100. Again, while specific dimensions and locations have been shown with respect to the footprint layout 140 pads for the antenna 100 depicted in FIG. 2A, it would be readily apparent to one of ordinary skill given the contents of the present disclosure that these dimensions may be modified in size, location, and/or the number of pads 102, 104, 106, 108, and 110 (e.g., more, or less) in alternative implementations. See, for example, the example illustrated above for FIG. 1A.

Referring now to FIG. 2B, the top layer artwork 200 of the antenna is shown and described in detail. As used herein, the term top layer artwork 200 refers to the layer of artwork that is disposed further away from the system level PCB 400, upon which the antenna 100 is mounted, than the bottom layer artwork 250 illustrated in FIG. 2C. As illustrated in FIG. 2B, the top layer artwork 200 also includes four (4) discrete metallization(s), namely, the first metallization 210, the second metallization 220, the third metallization 230, and the fourth metallization 240. The first metallization 210 may be positioned on the right side 114 of the antenna 100 and may be generally rectangular in shape. At the top portion of the first metallization 210, is a through hole via 202, which connects the top layer artwork 200 with the bottom layer artwork 250 illustrated in FIG. 2C. The first metallization 210 contributes to the lower band frequency performance of the antenna 100, although there may be substantial radiation coming off the corners of the antenna 100 as well (e.g., from the top left pad 102 and the top right pad 104 shown in FIG. 2A).

Surface current simulations for the second metallization 220 were utilized to maximize the derivative of current with respect to space. Specifically, the second metallization 220 may be generally L-shaped, although the second metallization 220 may utilize one or more choke point(s) 222 and one or more truncation feature(s) 224 to maximize the derivative of current with respect to space. In some implementations, the choke point(s) 222 may be positioned between the fifth metallization (260, FIG. 2C) and the sixth metallization (270, FIG. 2C). The lower left-hand corner of the second metallization 220 as well as the upper right-hand corner of the second metallization 220 may also include through hole vias 202 that have been strategically placed to maximize antenna radiating efficiency. As a brief aside, placement of the through hole vias 202 aid in maximizing radiation efficiency by positioning these vias 202 so that these vias 202 are either coincident with air or otherwise close to the PCB edge.

As a brief aside, the minimization of the overlap of the metallization's 210, 220, 230, 240 present on the top layer 200 of the antenna 100 with the metallization's 260, 270, 280, 290, 295 present on the bottom layer 250 of the antenna 100 results in minimization of inherent capacitance. This minimization of capacitance in turn maximizes the bandwidth operating characteristics for the antenna 100. The second metallization 220 on the top layer artwork 200 overlaps portions of the metallization areas on the bottom layer artwork 250 shown in FIG. 2C (i.e., portions of the fifth metallization 260, the sixth metallization 270, and the seventh metallization 280). The third metallization 230 may be generally rectangular in shape and may be generally overlaid with the eighth metallization 290 (or portions thereof) shown in FIG. 2C. The fourth metallization 240 may be generally U-shaped. The fourth metallization 240 may also include two through hole vias 202 positioned on opposing ends of the generally U-shaped fourth metallization 240. The through hole via 202 located in the upper left of the fourth metallization 240 may be connected with the sixth metallization 270 on the bottom layer artwork 250 of the antenna 100, while the through hole via 202 located on the right-hand side of the fourth metallization is connected with the fifth metallization 260 on the bottom layer artwork 250 of the antenna 100. The upper left portion of the fourth metallization 240 may also include one or more angled contour(s) 244, while the lower portion of the fourth metallization 240 may include one or more staircasing feature(s) 242. In some implementations, the angled contour 244 (or portions thereof) may overlap portions of the sixth metallization 270 shown in FIG. 2C, while the staircasing feature 242 may be positioned between the eighth metallization 290 and the ninth metallization 295 shown in FIG. 2C. Again, one or more of these features 242, 244 maximize the derivative of current with respect to space for the antenna 100.

Referring now to FIG. 2C, the bottom layer artwork 250 is shown and described in detail. As used herein, the bottom layer artwork 250 refers to the artwork layer located closer to the system level PCB 400, upon which the antenna 100 is mounted, as compared with the top layer artwork 200. The fifth metallization 260 may be generally U-shaped with the right-hand rectangular portion of the fifth metallization 260 being connected with the left-hand rectangular portion of the fifth metallization 260. The upper right and bottom left of the fifth metallization 260 may also include the aforementioned through hole vias 202 that connect the fifth metallization 260 with portions of the top layer artwork 200. The sixth metallization 270 may be generally rectangular in shape with a truncated lower left-hand corner. Through hole vias 202 located on the sixth metallization may be connected with portions of the top layer artwork 200. These through hole vias 202 may be generally located on the upper portion of the sixth metallization 270. A seventh metallization 280 may be L-shaped and may have a through hole via 202 that connects the seventh metallization 280 with the second metallization 220 located on the top layer artwork 200 of the antenna 100. The eighth metallization 290 and the ninth metallization 295 are generally rectangular in shape with the eighth metallization 290 being positioned generally underneath the third metallization 230, while the ninth metallization 295 is positioned underneath the lower right-hand corner of the fourth metallization 240. The eighth metallization 290 is also utilized to connect the antenna 100 to ground in system level implementations.

Exemplary Miniaturized LTE Antenna System—

Figure 3A:
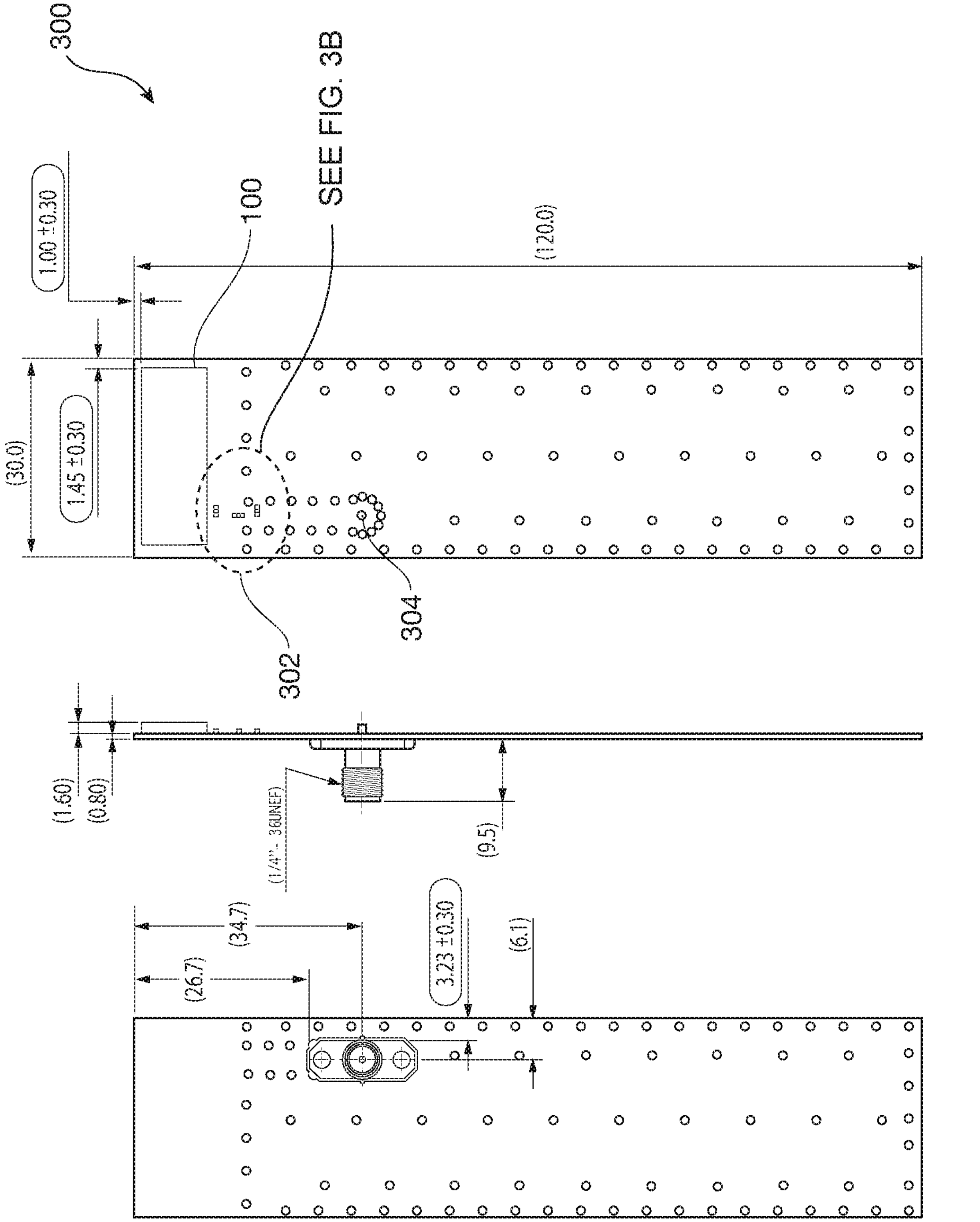
FIG. 3A is a top plan view, side plan view, and bottom plan view of an exemplary system level integration of the miniaturized LTE antenna of FIG. 1A, in accordance with the principles of the present disclosure.
Figure 3B:
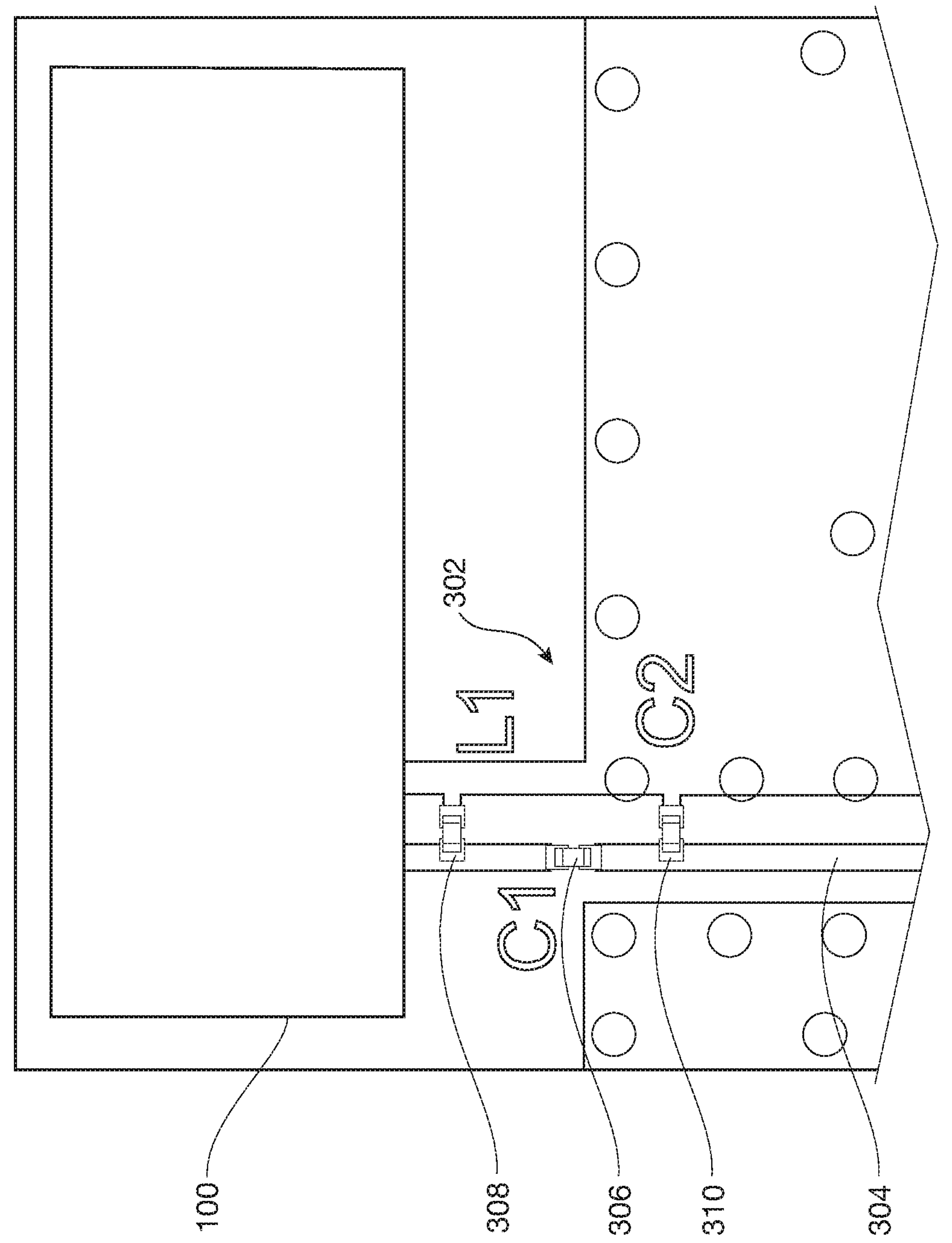
FIG. 3B is a top plan view of a first exemplary matching circuit for use with the antenna of FIGS. 1A-1C or FIGS. 2A-2C, in accordance with the principles of the present disclosure.
Figure 3C:
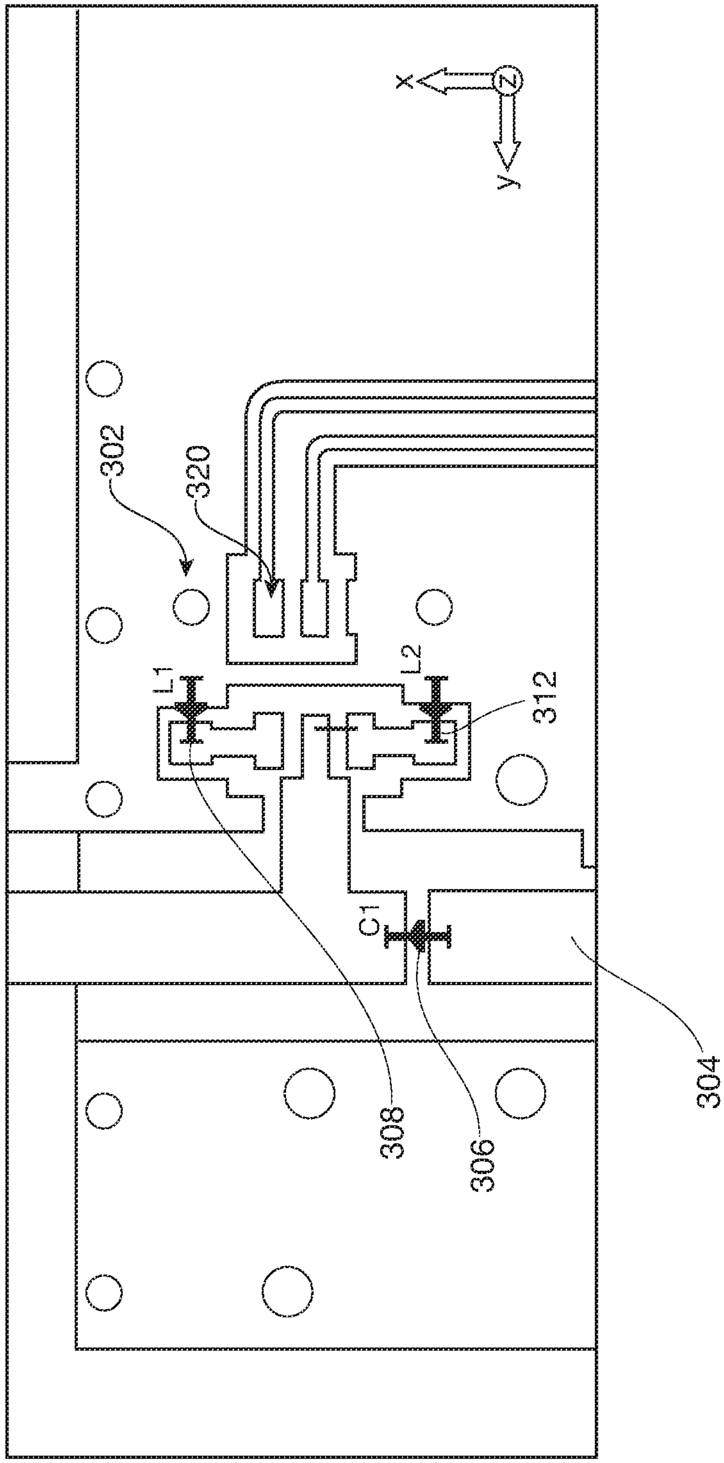
FIG. 3C is a top plan view of a second exemplary matching circuit for use with the antenna of FIGS. 1A-1C or FIGS. 2A-2C, in accordance with the principles of the present disclosure.
Figure 4:
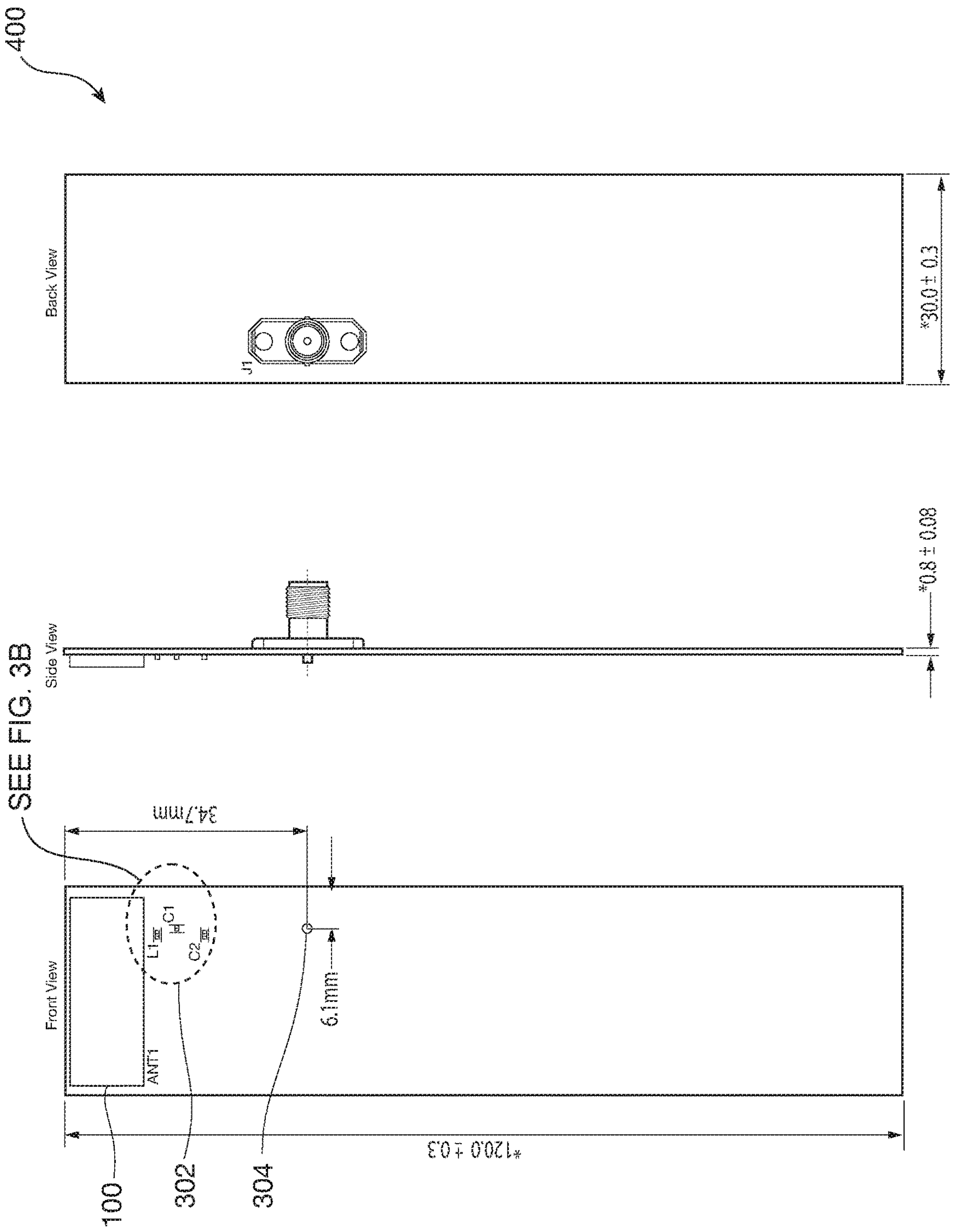
FIG. 4 is a top plan view, side plan view, and bottom plan view of an exemplary system level integration of the miniaturized LTE antenna of FIG. 2A, in accordance with the principles of the present disclosure.

Referring now to FIGS. 3A-3C, exemplary system level implementations 300 for the antenna 100 illustrated in FIGS. 1A-1C are shown and described in detail. FIG. 4 is an exemplary system level implementation 400 for the antenna 100 illustrated in FIGS. 2A-2C (i.e., a system level implementation 400 with mirrored artwork as discussed above with reference to FIGS. 2A-2C). FIG. 3A illustrates that the system level implementation 300 accommodates a system level PCB 300 measuring 30 mm in width and 120 mm in length. The system level PCB 300 includes an antenna feed 304 which transmits and/or receives signals being sent from and/or to the antenna 100. The system level implementation 300 also includes a matching circuit 302. The matching circuit 302 may be utilized without a switch 320 as illustrated in FIG. 3B, while in other implementations, the matching circuit 302 may utilize a switch 320 as illustrated in FIG. 3C. FIG. 4 also illustrates that the system level implementation 400 accommodates a system level PCB 400 measuring 30 mm in width and 120 mm in length. The system level PCB 400 also includes an antenna feed 304 which transmits and/or receives signals being sent from and/or to the antenna 100. The system level implementation 400 also includes a matching circuit 302 (see FIG. 3B, albeit mirrored). The matching circuit 302 may also be utilized without a switch 320 as illustrated in FIG. 3B, while in other implementations, the matching circuit 302 may utilize a switch 320 as illustrated in FIG. 3C (albeit mirrored).

As a brief aside, in some implementations, the matching circuit 302 enables the antenna 100 to have a customizable low frequency band. In other words, by switching between differing discrete electronic components (see, for example, the discussion with respect to FIGS. 3B and 3C), the frequency band for the antenna 100 may be altered. For example, dependent upon the size of the underlying system level PCB (and associated ground plane—see also FIG. 5C), the operable frequency bands for the antenna 100 may be tuned to a desired frequency by virtue of the inclusion of the matching circuit 302. As but yet another example, dependent upon which bands of interest were desired for a given implementation, differing electronic components may be utilized in order to have the antenna 100 resonate within those bands of interest.

Referring now to FIG. 3B, one exemplary matching circuit 302 is illustrated. This matching circuit may contain a first inductive electronic component 308, a first capacitive electronic component 306, and a second capacitive electronic component 310. For example, using these three discrete electronic components 308, 306, and 310, the antenna 100 provides for performance in both LTE bands twelve (12) and thirteen (13) at 700 MHz, as well as the higher frequency bands associated with LTE bands two (2) and four (4). Moreover, efficiencies as high as 20% have been measured on a ground plane size of 50 mm, which is much less than a quarter wavelength of 107 mm at 700 MHz. Moreover, modifications to the ground plane length on antenna performance merely shift efficiency up or down in magnitude without providing a left or right shift in resonant frequency for the antenna 100. See, for example, the plots illustrated in FIG. 3C. The first capacitive electronic component 306 may be placed in series with the antenna feed 304, while the first inductive electronic component 308 and second capacitive electronic component 310 may be shunted to ground. Accordingly, by altering the inductive values for the first inductive electronic component 308, a designer is able to tune the antenna 100 to a desired frequency band. For example, differing size ground planes on the system level PCB may present different impedances to the antenna 100. Accordingly, by altering the value of the first inductive electronic component 308 utilized for a given system level implementation 300, the designer is able to alter the operable frequency bands for the antenna 100.

Referring now to FIG. 3C, an alternative implementation of a matching circuit 302 for the antenna 100 is shown and described in detail. In this implementation, a switching component 320 is introduced which allows, for example, the antenna 100 to operate in two different frequency bands. Accordingly, through use of two different switch states, the entirety of, for example, the LTE low band (e.g., 700-960 MHz) may be covered through use of these two switching states without traditional losses associated with passing a radio frequency ("RF") signal through a switch. In other words, since you are only switching the shunt components through use of the switch 320, you avoid the insertion loss associated with switching, for example, the first capacitive electronic component 306 through various different matching circuit combinations (i.e., since the switch 320 is not in series with the feed line 304, there is less losses incurred than a traditional switched matching solution).

Figure 5A:
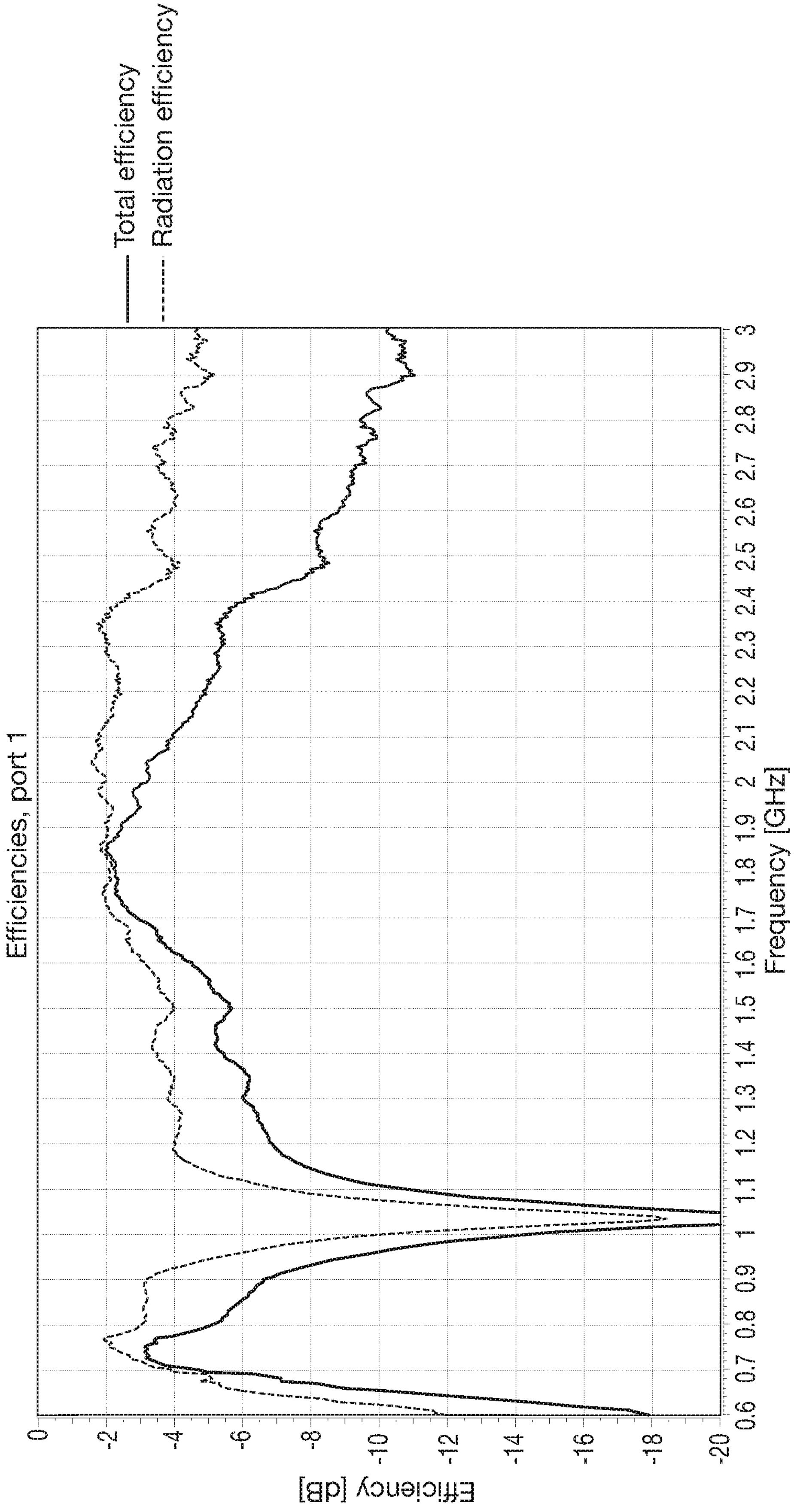
FIG. 5A is an exemplary plot of total efficiency and radiation efficiency as a function of frequency for a system level implementation for the antenna of FIGS. 1A-1C or FIGS. 2A-2C, in accordance with the principles of the present disclosure.
Figure 5B:
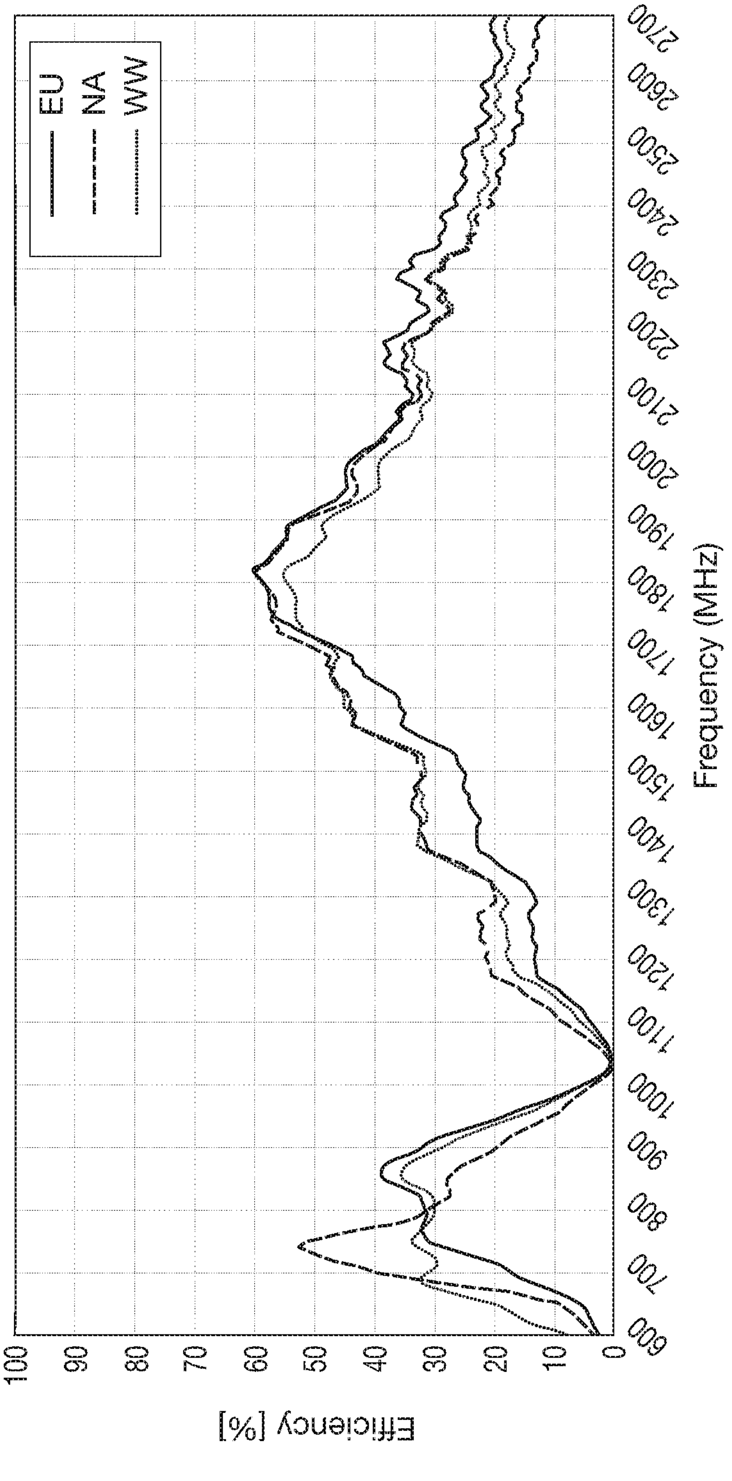
FIG. 5B is an exemplary plot of efficiency as a function of frequency for a system level implementation for the antenna of FIGS. 1A-1C or FIGS. 2A-2C in each of the European Union (EU), North America (NA) and worldwide (WW) markets, in accordance with the principles of the present disclosure.
Figure 5C:
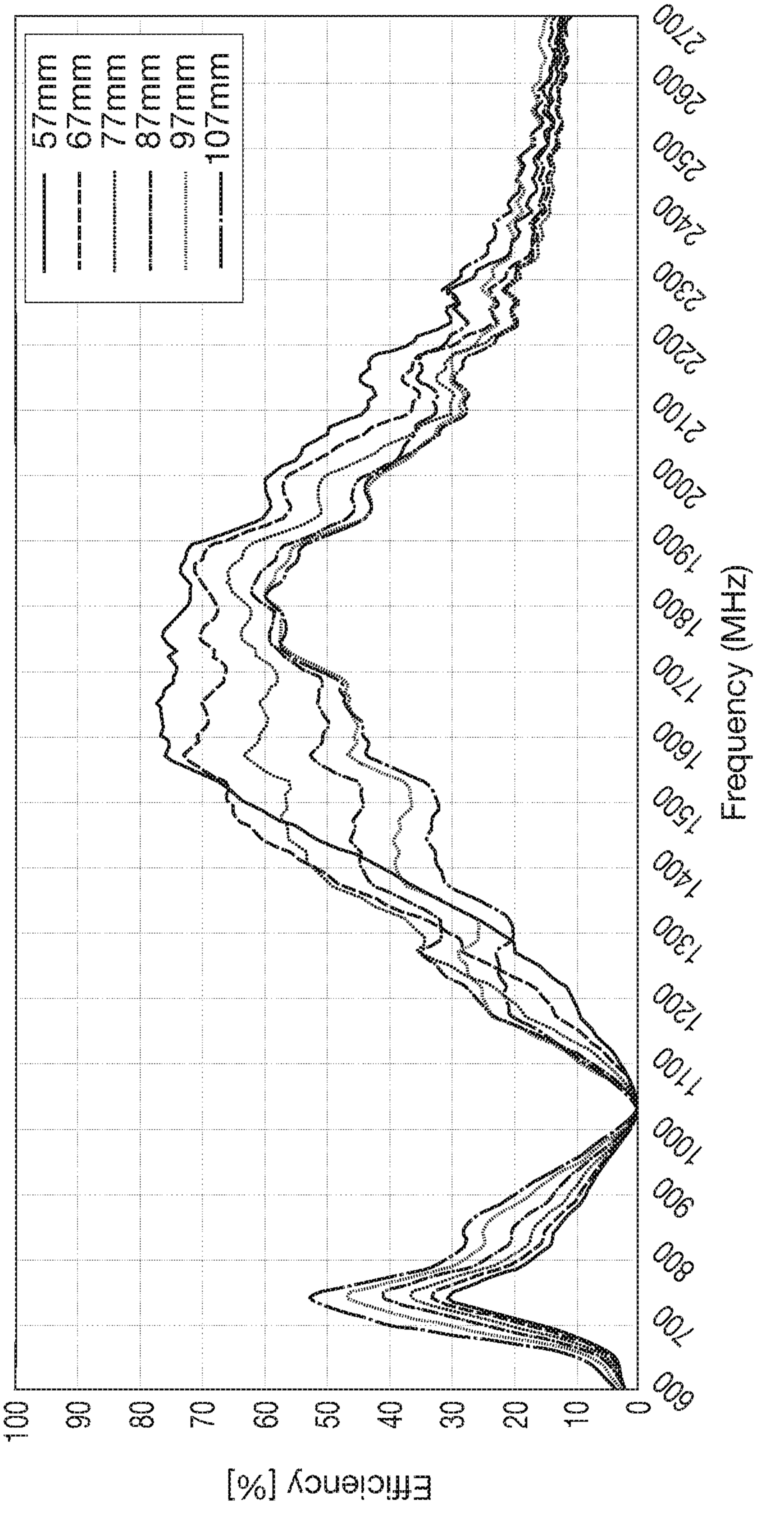
FIG. 5C is an exemplary plot of efficiency as a function of frequency for a system level implementation for the antenna of FIGS. 1A-1C or FIGS. 2A-2C having various ground plane sizes, in accordance with the principles of the present disclosure.

FIG. 5A illustrates an exemplary plot of radiation efficiency as well as total efficiency as a function of frequency, while FIG. 5B illustrates an exemplary plot of total efficiency as a function of frequency for implementations that have been designed for: (1) the European Union (EU) market; North American (NA) markets, as well as worldwide (WW) markets.

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. An antenna for use in long-term evolution (LTE) frequency bands, comprising:

a dielectric substrate comprising a first surface and a second opposing surface;

a first metallization layer disposed on the first surface of the dielectric substrate, the first metallization layer comprising a first discrete metallization, a second discrete metallization, a third discrete metallization, and a fourth discrete metallization; and a second metallization layer disposed on the second opposing surface of the dielectric substrate, the second metallization layer comprising a fifth discrete metallization, a sixth discrete metallization, a seventh discrete metallization, an eighth discrete metallization, and a ninth discrete metallization;

wherein the antenna comprises a plurality of through hole vias that:

connect the first discrete metallization with the fifth discrete metallization;

connect the second discrete metallization with both the sixth discrete metallization and the seventh discrete metallization; and connect the fourth discrete metallization with both the fifth discrete metallization and the sixth discrete metallization;

wherein the seventh discrete metallization, the eighth discrete metallization, and the ninth discrete metallization comprise external terminations for a system level printed circuit board;

wherein the first discrete metallization comprises a generally rectangular shape; and wherein the second discrete metallization comprises a generally L-shaped metallization, the generally L-shaped metallization comprising two of the plurality of through hole vias, the two of the plurality of through hole vias being positioned at opposing ends of the generally L-shaped metallization.

2. The antenna of claim 1, wherein the second discrete metallization comprises both a choke point and a truncation feature.

3. The antenna of claim 2, wherein the truncation feature is positioned generally between the fifth discrete metallization and the sixth discrete metallization.

4. An antenna for use in long-term evolution (LTE) frequency bands, comprising:

a dielectric substrate comprising a first surface and a second opposing surface;

a first metallization layer disposed on the first surface of the dielectric substrate, the first metallization layer comprising a first discrete metallization, a second discrete metallization, a third discrete metallization, and a fourth discrete metallization; and a second metallization layer disposed on the second opposing surface of the dielectric substrate, the second metallization layer comprising a fifth discrete metallization, a sixth discrete metallization, a seventh discrete metallization, an eighth discrete metallization, and a ninth discrete metallization;

wherein the antenna comprises a plurality of through hole vias that:

connect the first discrete metallization with the fifth discrete metallization;

connect the second discrete metallization with both the sixth discrete metallization and the seventh discrete metallization; and connect the fourth discrete metallization with both the fifth discrete metallization and the sixth discrete metallization;

wherein the seventh discrete metallization, the eighth discrete metallization, and the ninth discrete metallization comprise external terminations for a system level printed circuit board;

wherein the first discrete metallization comprises a generally rectangular shape; and wherein the fourth discrete metallization comprises a generally U-shaped metallization, the generally U-shaped metallization comprising an additional two of the plurality of through hole vias, the additional two of the plurality through hole vias being positioned at opposing ends of the generally U-shaped metallization.

5. The antenna of claim 4, wherein the fourth discrete metallization further comprises an angled contour as well as a staircasing feature.

6. The antenna of claim 5, wherein less than an entire portion of the angled contour overlaps the sixth discrete metallization.

7. The antenna of claim 6, wherein the staircasing feature is positioned generally between the eighth discrete metallization and the ninth discrete metallization.

8. A system comprising:

an antenna for use in long-term evolution (LTE) frequency bands, comprising:

a dielectric substrate comprising a first surface and a second opposing surface;

a first metallization layer disposed on the first surface of the dielectric substrate, the first metallization layer comprising a first discrete metallization, a second discrete metallization, a third discrete metallization, and a fourth discrete metallization; and a second metallization layer disposed on the second opposing surface of the dielectric substrate, the second metallization layer comprising a fifth discrete metallization, a sixth discrete metallization, a seventh discrete metallization, an eighth discrete metallization, and a ninth discrete metallization;

wherein the antenna comprises a plurality of through hole vias that:

connect the first discrete metallization with the fifth discrete metallization;

connect the second discrete metallization with both the sixth discrete metallization and the seventh discrete metallization; and connect the fourth discrete metallization with both the fifth discrete metallization and the sixth discrete metallization; and a system level printed circuit board upon which the antenna is disposed;

wherein the seventh discrete metallization, the eighth discrete metallization, and the ninth discrete metallization comprise external terminations for the system level printed circuit board;

wherein the seventh discrete metallization comprises a signal interface to a feed connection located on the system level printed circuit board; and the eighth discrete metallization comprises an interface to matching circuitry located on the system level printed circuit board.

9. The system of claim 8, wherein the matching circuitry comprises a switch that enables the antenna to switch between a plurality of operating frequencies for the antenna.

10. The system of claim 8, wherein the first discrete metallization comprises a generally rectangular shape.

11. The system of claim 10, wherein the second discrete metallization comprises a generally L-shaped metallization, the generally L-shaped metallization comprising two of the plurality of through hole vias, the two of the plurality of through hole vias being positioned at opposing ends of the generally L-shaped metallization.

12. The system of claim 11, wherein the fourth discrete metallization comprises a generally U-shaped metallization, the generally U-shaped metallization comprising an additional two of the plurality of through hole vias, the additional two of the plurality through hole vias being positioned at opposing ends of the generally U-shaped metallization.

13. The system of claim 12, wherein the fourth discrete metallization further comprises an angled contour as well as a staircasing feature.

14. The system of claim 13, wherein less than an entire portion of the angled contour overlaps the sixth discrete metallization.

15. The system of claim 14, wherein the staircasing feature is positioned generally between the eighth discrete metallization and the ninth discrete metallization.

* * * * *